US009767159B2

(12) United States Patent
Chen et al.

(10) Patent No.: US 9,767,159 B2
(45) Date of Patent: Sep. 19, 2017

(54) RANKING SEARCH RESULTS

(71) Applicant: Google Inc., Mountain View, CA (US)

(72) Inventors: Steve Chen, Santa Clara, CA (US);
Sara Su, San Jose, CA (US); Michael Aaron Safyan, Palo Alto, CA (US);
Jason B. Douglas, San Francisco, CA (US); Samuel Shoji Fukujima Goto, Mountain View, CA (US)

(73) Assignee: Google Inc., Mountain View, CA (US)

(*) Notice: Subject to any disclaimer, the term of this patent is extended or adjusted under 35 U.S.C. 154(b) by 260 days.

(21) Appl. No.: 14/304,083

(22) Filed: Jun. 13, 2014

(65) Prior Publication Data
US 2015/0363401 A1 Dec. 17, 2015

(51) Int. Cl.
G06F 17/30 (2006.01)

(52) U.S. Cl.
CPC .... *G06F 17/3053* (2013.01); *G06F 17/30554* (2013.01); *G06F 17/30749* (2013.01)

(58) Field of Classification Search
CPC ........... G06F 17/3053; G06F 17/30424; G06F 17/30554; G06F 17/30749
USPC ...... 704/9, 2; 705/14.53, 7.29, 14.73, 14.45, 705/14.54, 14.66, 14.67, 26.43, 26.7, 705/27.1, 14.47, 14.49, 14.52, 14.55, 705/14.58, 14.71, 2, 26.3, 26.35, 26.41, 705/26.62, 27.2, 30, 319, 39, 7.28, 7.36; 707/723, 748, 751, E17.014, 722, 754, 707/769, E17.005, E17.009, E17.017, 707/E17.108, 610, 706, 709, 711, 732, 707/767; 709/204, 206, 224, 203, 216, 709/217, 226
See application file for complete search history.

(56) References Cited

U.S. PATENT DOCUMENTS 7,617,225 B2   11/2009   Arrouye et al.
7,716,223 B2   5/2010   Haveliwala
(Continued)

FOREIGN PATENT DOCUMENTS

EP   1862922   12/2007
EP   2474905   7/2012
(Continued)

OTHER PUBLICATIONS

International Search Report and Written Opinion in International Application No. PCT/US2015/037207, mailed Sep. 8, 2015, 9 pages.
(Continued)

*Primary Examiner* — Jay Morrison
*Assistant Examiner* — Ken Hoang
(74) *Attorney, Agent, or Firm* — Fish & Richardson P.C.

(57) ABSTRACT

Methods, systems, and apparatus, including computer programs encoded on a computer storage medium, for providing ranked search results responsive to a query. In one aspect, a method includes receiving, from a user device, a query specifying an entity, determining two or more resources each of which provide media content related to the entity, for each of the resources, determining an effectiveness measure that is a measure of the effectiveness of the resource to present, to a user of the user device, the media content related to the entity, ranking the resources using, at least in part, the respective effectiveness measure, and providing, to the user device, a presentation of search results for the ranked resources.

21 Claims, 4 Drawing Sheets

(56) References Cited

U.S. PATENT DOCUMENTS

| | | | |
|---|---|---|---|
| 7,761,448 B2* | 7/2010 | Meyerzon | G06F 17/30864 704/1 |
| 8,086,957 B2 | 12/2011 | Bauchot | |
| 8,458,384 B2 | 6/2013 | Johnson | |
| 8,510,648 B2 | 8/2013 | Harman et al. | |
| 8,510,764 B1 | 8/2013 | Deselaers | |
| 8,515,979 B2 | 8/2013 | Mehta | |
| 8,527,874 B2 | 9/2013 | Friedman | |
| 8,554,345 B2 | 10/2013 | Fernandez | |
| 8,566,173 B2* | 10/2013 | Mahaniok | G06F 8/60 705/26.1 |
| 8,583,632 B2 | 11/2013 | Libes | |
| 8,595,450 B2 | 11/2013 | Nguyen et al. | |
| 8,645,362 B1 | 2/2014 | Jain et al. | |
| 8,745,108 B2 | 6/2014 | Jansson | |
| 9,275,054 B2* | 3/2016 | Paul | G06F 17/30029 |
| 2004/0030882 A1 | 2/2004 | Forman | |
| 2005/0177562 A1 | 8/2005 | Raciborski | |
| 2006/0242138 A1* | 10/2006 | Brill | G06F 17/30864 |
| 2007/0192300 A1* | 8/2007 | Reuther | G06F 17/30427 |
| 2007/0209080 A1 | 9/2007 | Ture | |
| 2008/0313190 A1 | 12/2008 | Cheng et al. | |
| 2009/0150363 A1 | 6/2009 | Gross et al. | |
| 2010/0082661 A1 | 4/2010 | Beaudreau | |
| 2010/0185612 A1* | 7/2010 | Kelly | G06F 17/30867 707/732 |
| 2010/0257466 A1 | 10/2010 | Wroblewski et al. | |
| 2010/0306191 A1 | 12/2010 | LeBeau et al. | |
| 2011/0252038 A1 | 10/2011 | Schmidt | |
| 2011/0307463 A1 | 12/2011 | Kasterstein et al. | |
| 2011/0314004 A1 | 12/2011 | Mehta | |
| 2012/0124061 A1 | 5/2012 | Macbeth et al. | |
| 2012/0124062 A1* | 5/2012 | Macbeth | G06F 9/445 707/749 |
| 2012/0158685 A1 | 6/2012 | White | |
| 2012/0179706 A1 | 7/2012 | Hobbs | |
| 2012/0179955 A1 | 7/2012 | French | |
| 2012/0221724 A1 | 8/2012 | Chor | |
| 2012/0254776 A1 | 10/2012 | Corella et al. | |
| 2012/0284256 A1* | 11/2012 | Mahajan | G06F 17/3087 707/722 |
| 2012/0290441 A1* | 11/2012 | Mahaniok | G06F 8/60 705/26.62 |
| 2012/0290584 A1 | 11/2012 | De Bona et al. | |
| 2012/0316955 A1 | 12/2012 | Panguluri et al. | |
| 2012/0323898 A1 | 12/2012 | Kumar et al. | |
| 2013/0006897 A1 | 1/2013 | Jain et al. | |
| 2013/0047149 A1 | 2/2013 | Xu et al. | |
| 2013/0054698 A1* | 2/2013 | Lee | G06Q 30/0259 709/204 |
| 2013/0110815 A1* | 5/2013 | Tankovich | G06F 17/30867 707/711 |
| 2013/0111328 A1 | 5/2013 | Khanna | |
| 2013/0122861 A1 | 5/2013 | Kim et al. | |
| 2013/0124606 A1 | 5/2013 | Carpenter et al. | |
| 2013/0191360 A1 | 7/2013 | Burkard et al. | |
| 2013/0232256 A1 | 9/2013 | Lee et al. | |
| 2013/0246415 A1* | 9/2013 | Davis | G06F 17/30702 707/732 |
| 2013/0298007 A1 | 11/2013 | Cullen | |
| 2013/0311458 A1 | 11/2013 | Goel et al. | |
| 2013/0325856 A1 | 12/2013 | Soto Matamala et al. | |
| 2014/0019958 A1 | 1/2014 | Sherman | |
| 2014/0108913 A1 | 4/2014 | Bourke et al. | |
| 2014/0115479 A1 | 4/2014 | Wang | |
| 2014/0172412 A1 | 6/2014 | Viegas et al. | |
| 2014/0214461 A1* | 7/2014 | Diliberto | G06Q 30/02 705/5 |
| 2014/0297455 A1* | 10/2014 | Zhao | G06Q 30/0631 705/26.7 |
| 2014/0358916 A1* | 12/2014 | Anand | G06F 17/30991 707/732 |
| 2015/0347585 A1* | 12/2015 | Klotz | G06F 17/30867 707/706 |

FOREIGN PATENT DOCUMENTS

| | | |
|---|---|---|
| EP | 2495670 | 9/2012 |
| WO | 2014088636 | 6/2014 |

OTHER PUBLICATIONS

"About Rich Snippets and Structure Data," Webmaster Tools Help, downloaded from the internet on May 13, 2014, 3 pages https://support.google.com/webmasters/answer/99170?hl=en.

"Google Play Music and Google Now . . . a way to get them to play nice?" Android Forums at And . . . , downloaded from the internet on May 13, 2014, 12 pages, http://forums.androidcentral.com/google-nexus-5/332074-google-play-music-google-now-way-.

"Google Search for Song, Music Pays Automatically, Won't Turn Off?", Google Product Forums, downloaded from the internet on May 13, 2014, 2 pages, https://productforums.google.com/forum/#!topic/chrome/RiorLWnD4tg.

"MySpace Still Rules Good Search Results for Music Acts," MIT Music Think Tank, downloaded from the internet on May 13, 2014, 3 pages, http://www.musicthinktank.com/blog/myspace-still-rules-google-search-results-for-music-acts.html.

"Songs Playing Automatically," The Spotify Community, downloaded from the internet on May 13, 2014, 2 pages, https://community.spotify.com/t5/Help-Desktop-Linux-Mac-and/Songs-p . . .

Bavor, Jr., Clayton W. et al., U.S. Appl. No. 11/775,684, filed Jul. 10, 2007 for "Landing Page Score," 38 pages.

Ruxanda, M.M. et al., "Ranking Music Data by Relevance and Importance," Proceedings of the IEEE International Conference on Multimedia and Expo (ICME'08), 2008, 4 pages.

"Thing > Action," Schema.org, downloaded from the internet on Jun. 12, 2014, 3 pages, http://schema.org/Action.

International Search Report and Written Opinion in International Application No. PCT/US2015/035066, mailed Jul. 30, 2015, 12 pages.

International Search Report and Written Opinion in International Application No. PCT/US2014/011256, mailed Apr. 15, 2014, 12 pages.

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

"App Linking," [online] [Retrieved on Jan. 7, 2014]; Retrieved from the Internet URL: https://developers.facebook.com/docs/android/link-to-your-native-app/; 14 pages.

"Class Gecko View Content," [online] [Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through A "Web" Of Apps," [online] [Retrieved on Dec. 13, 2013]; Retrieved from the Internet URL: techcrunch.com/2013/05/22new-service-called-deeplink-me-will-let-mobile-users-navigate-through-a-web-of-apps/; 8 pages.

"Frequently Asked Questions—General Information," [online] [Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online] [Retrieved on Dec. 13, 2013]; Retrieved from the Internet URL: techcrunch.com/2013/10/31/android-4-4-kitkat-app-index-ing/; 6 pages.

"How to determine when an application is fully launched?" [online] [Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?," [online] [Retrieved on Dec. 13, 2013]; Retrieved from the Internet URL: stackoverflow.com/ques-

(56) References Cited

OTHER PUBLICATIONS tions/13639564/how-to-get-a-deep-link-of-my-application-from-the-windows-phone-marketplace-usin; 2 pages.
"Indexing apps just like websites," [online] [Retrieved on Dec. 13, 2013]; Retrieved from the Internet URL: googlewebmastercentral.blogspot.com/2013/10/indexing-apps-just-like-websites.html; 4 pages.
"Instant Pages on Google Chrome," [online] [Retrieved on Dec. 16, 2013]; Retrieved from the Internet URL: chrome.blogspot.jp/2011/instant-pages-on-google-chrome.html; 3 pages.
"Mobile deep linking," [online] [Retrieved on Dec. 13, 2013]; Retrieved from the Internet URL: en.wikipedia.org/wiki/Mobile_deep_linking; 2 pages.
"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.
"Ready FOr A "Web" of Apps? Quixey Launches AppURL, A New Way to Enable Deep Linking Across Mobile Applications," [online] [Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.
"Seven Tips for Supercharging Your Links," [online] [Retrieved on Jan. 7, 2014]; Retrieved from the Internet URL: goarticles.com/article/Seven-Tips-For-Supercharging-Your-Links/3056299/; 5 pages.
"Sharing to Google+ from your Android app," [online][Retrieved on Jan. 7, 2014]; Retrieved from the Internet URL: https://developers.google.com/+/mobile/android/share/#handling_incoming_deep_links; 2 pages.
"Visability for Your Apps/Android Developers" Developer.Andriod.com [online]. [Retrieved on Mar. 11, 2013]. Retrieved from the Internet: <URL: http://developer.android.com/distribute/googleplay/about/visibility.html>, 6 pages.
Google Play Store [online]. [Retrieved on Mar. 11, 2013]. Retrieved from the Internet: <URL: https://play.google.com/store>, 3 pages.
Klais, "5 SEO Tips to Get Mobile Apps Ranked in SERPs," Search Engine Land [online], Dec. 19, 2011 [retrieved on Mar. 11, 2013]. Retrieved from the Internet: <URL: http://searchengineland.com/5-seo-tips-to-get-mobile-apps-ranked-in-serps-104595>, 6 pages.
"Intents and Intent Filters," Android Developers [online]. [Retrieved on Jun. 24, 2014]. Retrieved from the Internet: http://developer.android.com/guide/components/intents-filters.html, 14 pages.
"Potential Actions," Schema.org [online]. [Retrieved on Jun. 24, 2014]. Retrieved from the Internet: http://schema.org/docs/actions.html, 11 pages.

* cited by examiner

RANKING SEARCH RESULTS

BACKGROUND

This specification relates to providing search results in response to a query.

The Internet provides access to a wide variety of resources, for example, video files, image files, audio files, or web pages, including content for particular subjects, book articles, or news articles. A search system can select one or more resources in response to receiving a search query. A search request is data that a user device submits to a search engine to satisfy the respective user's informational needs. A search request includes a search query that is usually in the form of text, e.g., one or more query terms, and may also include transcriptions of spoken search queries. The search system selects and scores resources based on their relevance to the search query and on their importance relative to other resources to provide search results. The search results are typically ordered according to the scores and presented according to this order.

A user device may present search results to a user with multiple different types of applications, such as different browsers or applications developed by content providers. A user may interact with the search results to interact with requested content, such as viewing an image, listening to a song, watching a video, or purchasing a product.

SUMMARY

In general, one innovative aspect of the subject matter described in this specification can be embodied in methods that include the actions of receiving, from a user device, a query specifying an entity, determining two or more resources each of which provide media content related to the entity, for each of the resources, determining an effectiveness measure that is a measure of the effectiveness of the resource to present, to a user of the user device, the media content related to the entity, ranking the resources using, at least in part, the respective effectiveness measure, and providing, to the user device, a presentation of search results for the ranked resources. Other embodiments of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The entity may include a musical artist or a music album. The entity may include a movie title or a name of a television show. Determining the two or more resources each of which provide media content related to the entity may include determining one or more resources each of which provide media content related to the entity and require a user of the user device to interact with the respective resource to enable the user device to present the respective media content.

In some implementations, determining the effectiveness measure for each resource may include determining, for each resource, a quantity of steps required by a user of the user device to present the media content on the user device upon accessing the respective resource. Determining the quantity of steps required by the user of the user device to present the media content on the user device upon accessing the respective resource may include determining that a first quantity of steps to be performed by the user of the user device to present the media content using a first resource is greater than a second quantity of steps to be performed by the user of the user device to present the media content using a second resource, and assigning the first resource a lower effectiveness measure than the second resource.

In some implementations, determining the effectiveness measure may include determining an affinity measure that indicates an affinity of the user for a corresponding publisher of the respective resource. Determining the affinity measure may include determining that the user device includes a first application for a first publisher and does not include a second application for a second publisher, and assigning a first resource for the first publisher a higher affinity measure than a second resource for the second publisher. Determining the affinity measure may include determining that the user device includes a first application for a first publisher that the user uses more frequently than a second application for a second publisher, and assigning a first resource for the first publisher with a higher affinity measure than a second resource for the second publisher. Determining the affinity measure may include determining a first quantity of first user devices operated by the user that include a first application for a first publisher and a second quantity of second user devices operated by the user that include a second application for a second publisher, determining that the first quantity is greater than the second quantity, and assigning a first resource for the first publisher a higher affinity measure than a second resource for the second publisher.

In some implementations, determining the affinity measure may include determining that the user has explicitly requested search results from a first publisher and not from a second publisher, and assigning a first resource for the first publisher a higher affinity measure than a second resource for the second publisher. Determining the affinity measure may include determining that the user subscribes to content from a first publisher and not from a second publisher, and assigning a first resource for the first publisher a higher affinity measure than a second resource for the second publisher. Determining the affinity measure may include determining that the user is connected to a first publisher on a social network and is not connected to a second publisher on the social network, and assigning a first resource for the first publisher a higher affinity measure than a second resource for the second publisher. Determining the affinity measure may include determining that the user has accessed first web pages published by a first publisher more than second web pages published by a second publisher, and assigning a first resource for the first publisher a higher affinity measure than a second resource for the second publisher. Determining the affinity measure may include determining that other users accessed the media content related to the entity from a first publisher more frequently than from a second publisher, and assigning a first resource for the first publisher a higher affinity measure than a second resource for the second publisher. Determining the affinity measure may include assigning each of the resources a respective affinity measure using a frequency with which respective media content provided by each of the respective resources is accessed.

In general, one innovative aspect of the subject matter described in this specification can be embodied in methods that include the actions of receiving, from a user device, a query specifying an entity, determining two or more resources each of which provide a transaction related to the entity, for each of the resources, determining an effectiveness measure that is a measure of the effectiveness of the resource to provide, to a user of the user device, the transaction related to the entity, ranking the resources using, at least in part, the respective effectiveness measure, and providing, to the user device, a presentation of search results for the ranked resources. Other embodiments of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The query may include a request for a restaurant reservation. Providing the presentation of the search results for the ranked resources may include providing a presentation of a first search result with a higher effectiveness measure more prominently than a second search results with a lower effectiveness measure. Providing the presentation of the first search result with the higher effectiveness measure more prominently than the second search results with the lower effectiveness measure may include providing a presentation with the first search result above the second search result.

Particular embodiments of the subject matter described in this specification can be implemented so as to realize one or more of the following advantages. In some implementations, a system may more prominently display search results with higher effectiveness measures to increase a likelihood that a resource for a top ranked search result satisfies a user's query. In some implementations, a system may more prominently display search results with higher effectiveness measures to increase a likelihood that a resource for a top ranked search result requires the same or fewer user interactions than other resources for the other search results. In some implementations, a system may more prominently display search results for entities that are physically located closer to a user than entities that are physically located farther away from the user. In some implementations, a system provides search results that include links for resources specific to a requesting user device and the software installed on the user device, e.g., the user device will be able to display the resources properly and allow a user operating the user device to interact with the resources as a developer intended. In some implementations, a system provides search results to a user device taking into consideration the software that a user operating the user device prefers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION 1.0 Overview

Figure 1A:
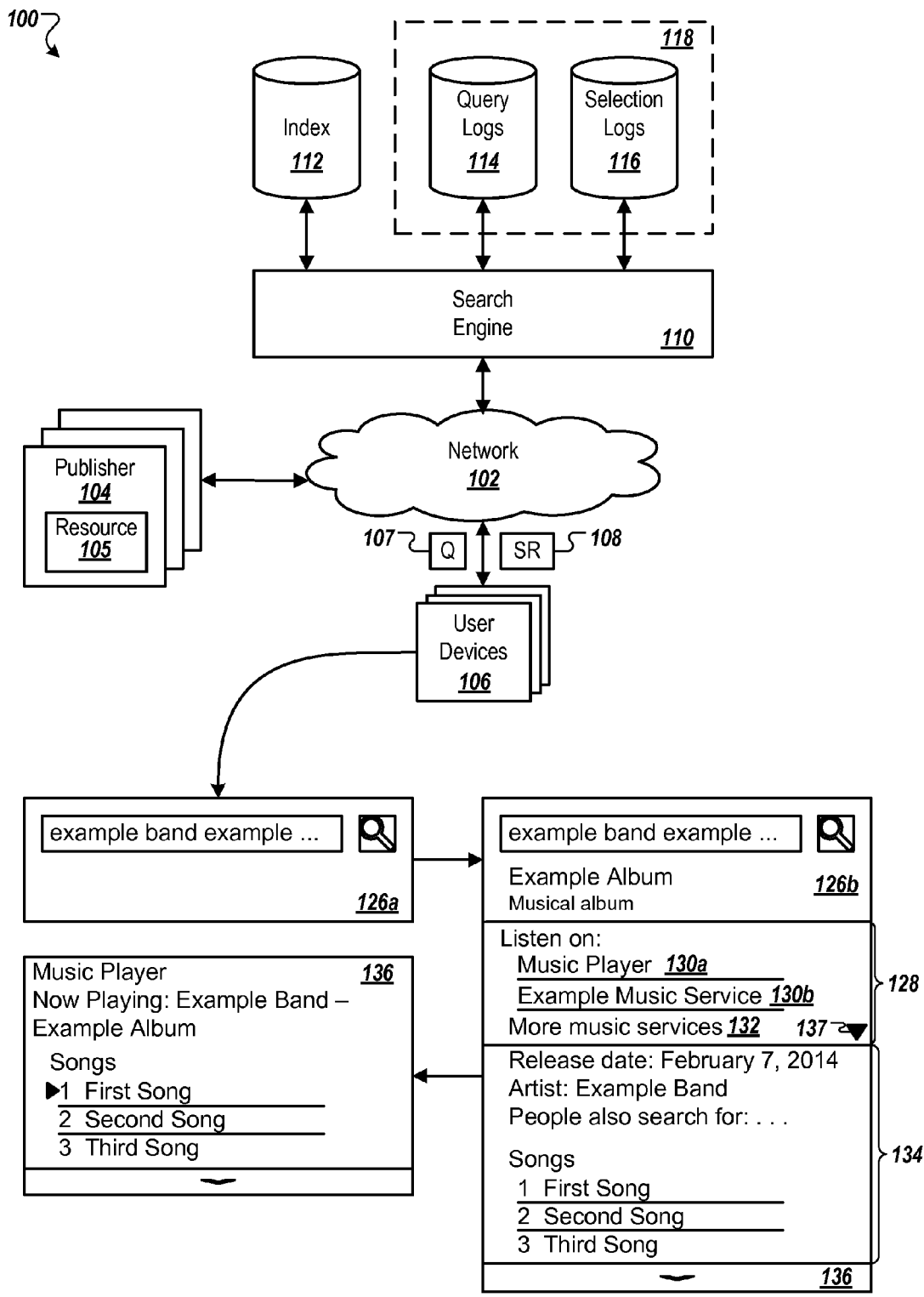
FIGS. 1A-B are a block diagram of an example environment in which a search engine ranks resources using an affinity measure of a user affinity for the resources and/or a quantity of steps required to access content on the resource.

A system determines a resource ranking using an effectiveness measure that is a measure of the effectiveness of the resource to present media content related to an entity to the user. The effectiveness measure can be determined using one or more signals, such as an affinity measure, e.g., that represents an affinity of a user for a particular resource or a particular type of resource, a quantity of steps required by the user to be presented with the media content after accessing the resource, and other signals.

For example, when a user submits a query for the musical group "example band" to a search engine, the search engine may determine that five publishers provide songs written by the musical group Example Band to which the user may listen, that the user is a subscriber of a service, e.g., a music service, provided by a particular one of the publishers, and rank a resource provided by that particular publisher higher than resources provided by the other publishers in a search results page.

When we refer to a publisher in this document we mean an entity that provides resources, e.g., a content provider, that a user may view and/or interact with, such as a web page, a song, or a video. A publisher may also include an entity that provides services to a user, such as airline reservations, hotel reservations, train reservations, etc. although the entity may not develop or maintain a corresponding web page or web site.

In some examples, the system may determine that when a user visits a web page or uses an application, the user needs to perform six actions to listen to a song on the web page or the application and when a user visits another web page or uses another application, the user needs to perform three actions to listen to the same song on the other web page or the other application. When the system receives a search request for the song, the system may provide a search results page with the other web page, or other application, ranked higher than the web page based on the quantity of actions required to listen to the song. We use the term web page, or the term application, to broadly include a web page that provides access to a particular resource, an application that provides access to the particular resource, or any other appropriate type of system that provides access to the particular resource.

The system may use other signals, algorithms or combinations of algorithms and/or signals when ranking the resources, such as a resource ranking algorithm, whether the user has an account with a respective publisher, a frequency or quantity of times the user accesses content or applications provided by the publisher, whether the user has a relationship with the publisher, e.g., on a social media network or has worked for the publisher, and how much information the resources provide about the requested content. For instance, when two web pages provide access to songs from the same album but one of the web pages provides additional details about the writing of the album or how the musical group that wrote the album was formed, the web page with additional details may be ranked higher than the web page with fewer details. The system may use the data provided by the additional details to better determine a probability that the corresponding resource is the resource for which a user is looking. In some examples, the system may determine that the web page with additional details is not what the user is looking for, e.g., and is for a cover band and not the musical group for which the user is searching, and rank the web page with additional details lower than another web page with fewer details.

1.1 Example Operating Environment

Figure 1B:
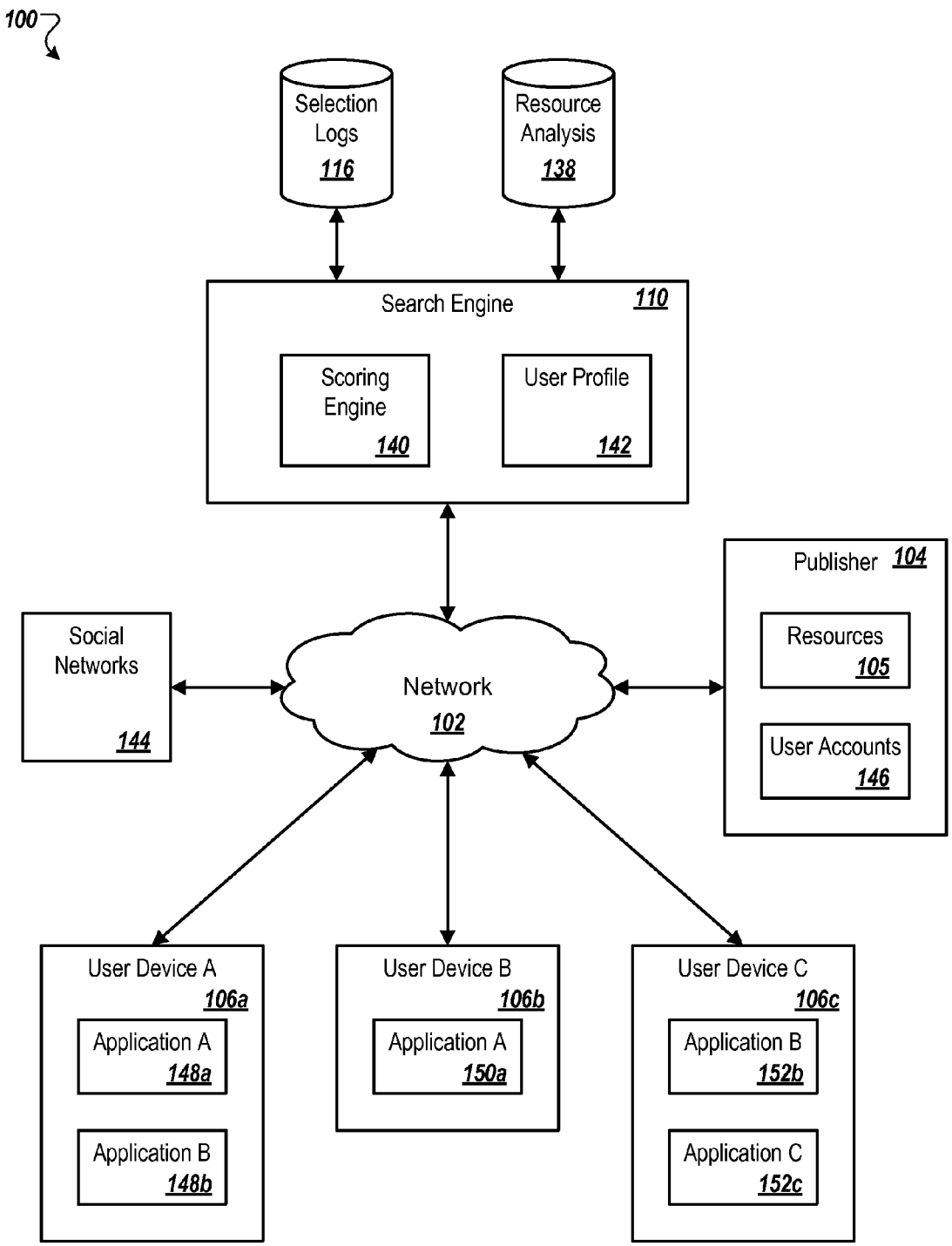

FIGS. 1A-B are a block diagram of an example environment 100 in which a search engine 110 ranks resources using an affinity measure of a user affinity for the resources and/or a quantity of steps required to access content on the resource. A computer network 102, such as a local area network (LAN), wide area network (WAN), the Internet, or a combination thereof, connects the publishers' 104 web sites, user devices 106, and the search engine 110. The online environment 100 may include many thousands of publisher web sites 104 and user devices 106.

A publisher's 104 web site includes one or more resources 105 associated with a domain and hosted by one or more servers in one or more locations. Generally, a web site is a collection of web pages formatted in hypertext markup language (HTML) that can contain text, images, multimedia content, and programming elements, for example, scripts. Each web site 104 is maintained by a content publisher, which is an entity that controls, manages and/or owns the web site 104.

A resource is any data that can be provided by a publisher's 104 web site over the network 102 and that has a resource address, e.g., a uniform resource identifier (URI). Resources may be HTML pages, electronic documents, images files, video files, audio files, and feed sources, to name just a few. The resources may include embedded information, e.g., meta information and hyperlinks, and/or embedded instructions, e.g., client-side scripts.

A user device 106 is an electronic device that is capable of requesting and receiving resources over the network 102. Example user devices 106 include personal computers (e.g., desktops or laptops), mobile communication devices (e.g., smart phones or tablets), and other devices that can send and receive data over the network 102 (e.g., televisions, and glasses or watches with network communication functionality). A user device 106 typically includes a user application, e.g., a web browser, to facilitate the sending and receiving of data over the network 102. The web browser can enable a user to display and interact with text, images, videos, music and other information typically located on a web page at a web site on the world wide web or a local area network. The user device 106 may use any appropriate application to send and receive data over the network 102 and present requested resources to a user.

To facilitate searching of these resources 105, the search engine 110 identifies the resources by crawling the publishers' 104 web sites and indexes the resources provided by the publishers' 104 web sites. The index data is stored in an index 112, shown in FIG. 1A.

The user devices 106 submit search queries 107 to the search engine 110. The search queries 107 are submitted in the form of a search request that includes the search query and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the query. The search engine 110 identifies the resources in the form of search results 108 and returns the search results 108 to the user device 106 in a search results resource, e.g., a search results web page. A search result is data generated by the search engine 110 that identifies a resource or provides information that satisfies a particular search query. A search result for a resource can include a web page title, a snippet of text extracted from the web page, and a resource locator for the resource, e.g., the URI of a web page or for the presentation of particular content or invocation of code for an operation in an application.

The search results are ranked based on scores related to the resources identified by the search results as well as their relationship to the search query and the context of the device that issued the query. Examples include global information retrieval ("IR") scores, authoritativeness scores for a particular query, and others. The search results are ordered according to these scores and provided to the user device according to the order.

The user devices 106 receive the search results pages and render the pages for presentation to users. In response to the user selecting a search result at a user device 106, the user device 106 stores data representing the user selection and requests the resource identified by the resource locator included in the selected search result. The publisher of the web site 104 hosting the resource receives the request for the resource from the user device 106 and provides the resource to the requesting user device 106. In some examples, in response to the user selecting a search result at a user device 106, the user device 106 launches an application identified by the search result and requests a corresponding resource from the launched application, e.g., identified by a link or URI for the search result. The identified application provides the corresponding resource, e.g., a user interface with information about the corresponding resource, to the user device 106.

In some implementations, the search queries 107 submitted from user devices 106 are stored in query logs 114. Selection data for the queries and the web pages referenced by the search results and selected by users are stored in selection logs 116. The query logs 114 and the selection logs 116 define search history data 118 that include data from and related to previous search requests associated with unique identifiers. The selection logs represent actions taken responsive to search results provided by the search engine 110. The query logs 114 and selection logs 116 can be used to map search queries 107 submitted by user devices to resources that were identified in search results 108 and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices, the actions taken in response to the queries, and how often the queries have been submitted. The selection logs 116 and the query logs 114, e.g., the search history data 118, may be stored in a single database, e.g., for all of the search history data 118, or in separate databases. The single database, or another database, may include the index 112.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

1.2 Example System

When the search engine 110 receives a query 107 from a user device 106, for example, such as a query for the musical group "example band" or the album "example album" entered on a search page 126, the search engine 110 determines resources responsive to the query 107. The resources may include publishers' web pages or applications with media files for the songs in the album, such as "First Song," and "Second Song," e.g., when the query is for the album, or popular songs by the musical group, e.g., when the query is specific to a group. The search engine 110 assigns the resources respective effectiveness measures using an affinity between the user and the resources and/or an ease with which a user of the user device 106 may listen to the album's songs and provides ranked search results to the user device 106 that correspond with the resources and are ranked according to the resources' effectiveness measures.

The user device 106 presents a search results page 126*b* to the user that includes search results 128, e.g., listen on links 130*a-b* for each publisher, e.g., "Music Player" and "Example Music Service," and details 134 for the album, including the album's release date, names of other albums or artists which the user may like, and the songs included in the album. The user may view additional details about the album, e.g., that are not initially included in the presentation of the search results page 126*b*, by scrolling through the content of the search results page 126*b* and/or selecting an additional content link 136.

A drop down option 137 may allow a user to view the details 134 for the album in the search results page 126*b* when the details 134 are not presented initially with the search results page 126*b*, e.g., upon an initial selection of the drop down option 137, and remove the details 134 from the search results page 126*b*, e.g., upon a second selection of the drop down option 137.

When the search results page 126*b* is initially presented on the user device, the search results page 126*b* may include the list of search results 128, e.g., two or more search results, each of which corresponds with a different resource, maintained by a single publisher and/or different publishers. The user may select a more music services option 132 to view additional search results for other resources that are responsive to the query. The search results page 126*b* may include a default number of search results, such as two or three, that may be determined by the search engine 110 or may be specified by the user, e.g., in a user profile.

A particular publisher, for example, may have two web pages for an artist, one maintained by the publisher and another maintained by the artist's fans. As described in more detail below, the search engine 110 may assign the two web pages effectiveness measures and rank the web pages using an affinity between the user and each of the web pages. When the user has previously accessed the web page maintained by the publisher and not accessed the web page maintained by the artist's fans, the web page maintained by the publisher may have a higher effectiveness measure than the web page maintained by the artist's fans. In some examples, when other people more frequently access the web page maintained by the artist's fans than the web page maintained by the publisher, the web page maintained by the artist's fans may have a higher effectiveness measure, and a respective search results will be presented more prominently on the search results page 126*b*, than the web page maintained by the publisher.

The particular publisher may also have a web site may also have other web pages, one maintained by the artist and others maintained by other fans of the artist. The search engine 110 may use an effectiveness measure for each of the other web pages, in addition to effectiveness measures for the two web pages, when determining a ranking for corresponding search results.

In response to user selection of the listen on music player link 130*a* the user device 106 may present a web page 136, hosted by a particular publisher, e.g., Music Player, to the user. Media content, e.g., the first song of the album—"First Song," may begin to play in response to a request for the web page 136, upon presentation of the web page 136 by the user device or shortly after, and/or in response to user interaction with the web page 136, e.g., selection of a play button.

The search engine 110 may rank the search results, e.g., presented in the search results page 126*b*, using respective effectiveness measures, e.g., an ease with which the media content is provided to a user upon presentation of the respective resource. For instance, when the web page 136 automatically begins playing a song and another web page requires user interaction with the web page before playing the song, the search engine 110 will give a search result for the web page 136 a higher effectiveness measure and display the search result more prominently in the search results page 126*b* than another search results for the other web page, e.g., the search result will be displayed above the other search results on the search results page 126*b*.

The search engine 110 may store resource analysis data 138, shown in FIG. 1B, that identifies the ease with which media content is provided to a user for a particular resource. The resource analysis data 138 may be specific to particular languages, particular regions, e.g., from which a search query originated, particular web sites maintained by publishers, particular resources or web pages within a web site, and/or particular types of user devices. The resource analysis data 138 may include a score for each resource that represents a quantity of actions a user needs to perform to view the corresponding media content and/or scores that indicate how easy those actions are to perform. The scores may be scaled, e.g., to a value between zero and one. A higher score may represent a lower ease of access. In some examples, a lower score may represent a lower ease of access.

For instance, when a resource is presented on a display of a desktop computer, media content may automatically begin to play and when the same resource, or a modified version of the resource, e.g., a mobile version, is presented on a mobile device, the resource may require user input, e.g., selection of one or more buttons, before beginning to play the media content. In this example, a search result for the same resource may have a different ranking depending on the type of user device that provided a query to the search engine 110, e.g., the search result may have a higher priority when provided to the desktop computer than when provided to the mobile device.

The resource analysis data 138 may also include different measures for different types of users. Users with accounts for particular publishers may have certain scores, while users without accounts for those particular publishers may have other, e.g., lower, scores. For instance, it may take a user without a publisher account more steps to complete the same action, e.g., to play a song, compared to a user with an account.

The search engine 110 includes a scoring engine 140 that analyzes the resource analysis data 138 and other data to determine effectiveness measures for resources responsive to a query, e.g., "example band example album." For example, the scoring engine 140 determines the effectiveness measures of resources in response to a particular query from a particular user and may then use the effectiveness measures to determine a ranking of the determined resources with respect to the user, or a ranking of search results which correspond with the determined resources.

The scoring engine 140 may use a user profile 142 that indicates preferences of the user that operates a user device A 106a that provided a query to the search engine 110 when determining an effectiveness measure or an affinity measure. The user profile 142 may explicitly indicate that the user prefers to view resources from particular publishers, does not want to view resources from other publishers, has an account with certain publishers, or a combination of the three in addition to other user profile settings.

The scoring engine 140 may determine that a user has a relationship with one or more of the publishers 104 on a social network 144, or various, e.g., different, relationships with the publishers 104 on different social networks, and use the relationship data when determining an affinity measure. When the user creates a relationship with a particular publisher on a social network, the scoring engine 140 may determine that the user is more likely to view content created by that particular publisher and assign that content a higher affinity measure so that a corresponding search results is presented more prominently, e.g., higher, in a search results page. In some examples, when a user interacts with a particular publisher more than another publisher, e.g., on a particular social network, on multiple social networks, or through other forms of communication such as email or telephone, the scoring engine 140 may assign a higher affinity measure to resources maintained by the particular publisher than resources maintained by the other publisher.

Data representing user accounts 146 may also provide the scoring engine 140 or the search engine 110 with user affinity data that represents a user affinity for particular resources, particular types of resources, particular publishers, particular types of publishers, etc. The user accounts 146 may indicate publishers which provide news, a music or media service, updates, or other articles to particular users, and/or publishers from which users have purchased media content. In some examples, a particular publisher may require a user without a user account to perform five actions to access media content and may automatically play media content with presentation of a web page for a user with a user account. The scoring engine 140 may determine whether a particular resource will be presented on a user device operated by a user with an account for the respective publisher or not. For instance, when the search engine 110 receives a request for "example band" from the user device A 106a, operated by a user with a user account for a particular publisher, a particular search result, for a particular web page hosted by the particular publisher, may have a higher affinity measure and be presented first in a search results page. But, when the search engine 110 receives a request for "example band" from the user device B 106b, operated by another user without a user account for the particular publisher, the particular search result may have a lower affinity measure, e.g., and be presented third or fourth in a search results page, when the scoring engine 140 determines that the other user will have to perform more actions to access a song by Example Band.

In some implementations, the scoring engine 140 may use data that indicates applications installed on user devices when ranking resources responsive to a query. When the user device A 106a has application A 148a and application B 148b installed, for publishers A and B respectively, the search engine 110 may provide the user device A 106a with search results identifying resources A, B, and C, maintained by publishers A, B, and C respectively. In this example, the search results for resources A and B will have higher affinity measures than the search result identifying resource C. If the search engine 110 receives the same query from the user device C 106c, which has application B 152b and application C 152c installed, for publishers B and C respectively, the search results for resources B and C, maintained by publishers B and C respectively, will have a higher affinity measures than a search results for the resource A, maintained by publisher A.

In examples when multiple user devices are operated by the same user, such as the user device A 106a and the user device B 106b, the search engine 110 may determine a user's affinity for a particular publisher using the applications installed on both devices. When the user device A 106a and the user device B 106b both have application A, 148a and 150a, installed but only the user device A 106a has application B 148b installed, the scoring engine 140 may assign a higher affinity measure to resources maintained by publisher A, who maintains application A, than to resources maintained by publisher B, who maintains application B. The scoring engine 140 may also determine that a single user device includes multiple applications created by the same publisher, e.g., a music application and a movie application, and score resources maintained by that publisher higher than resources maintained by another publisher who does not maintain any applications installed on the single user device or maintains only one of those applications. The analysis of the applications installed on the user devices 106a-c may indicate that a user installed application A on both user devices A-B 106a-b while application B 148b was pre-installed on user device A 106a and/or a greater user preference, e.g., affinity, for application A over application B.

The scoring engine 140 may also use a frequency or duration of application use when assigning scores to resources. When application B 148b is launched more frequently than application A 148a and/or the duration of use of application B 148b is greater than application A 148a, the scoring engine 140 may assign a higher affinity measure to resource B, maintained by the same publisher that created application B 148*b*, than resource A, maintained by the same publisher that created application A 148*a*. The scoring engine 140 may also use a frequency of use or duration of use across all user devices operated by the same user. The search engine 110 may determine that multiple user devices correspond with the same user using user account data or any other appropriate method.

The scoring engine 140, or another component of the search engine 110 such as a ranking engine, may rank resources or search results using the effectiveness measures, including the affinity measures. The ranked search results are then provided for presentation, e.g., in the search results page 126*b*.

2.0 Example Process Flow

Figure 2:
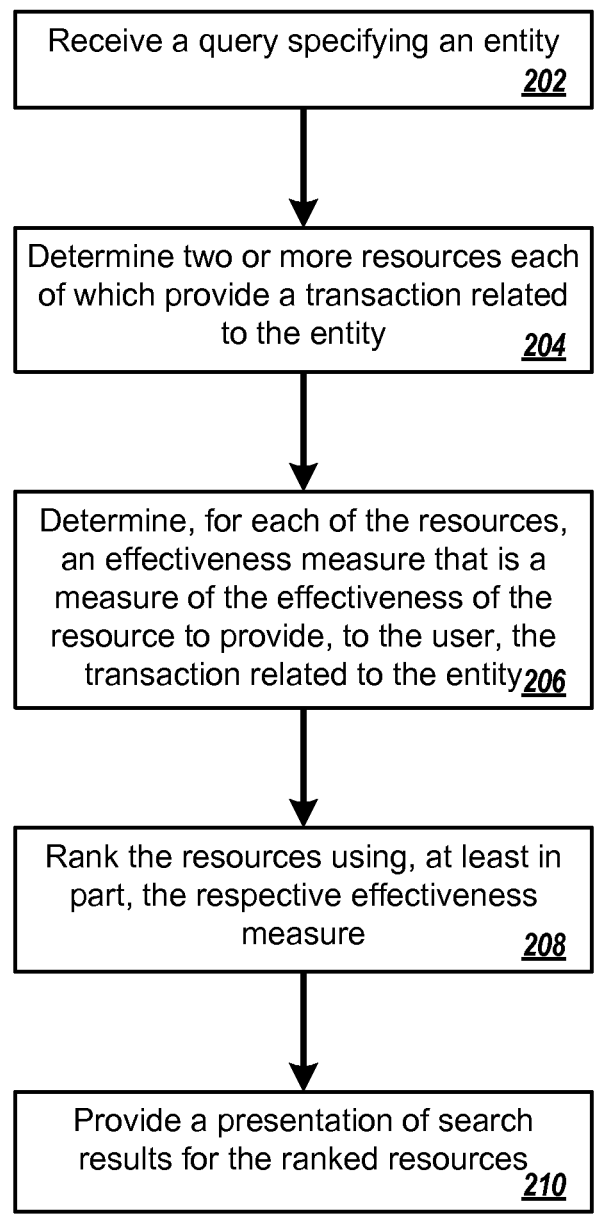
FIG. 2 is a flow diagram of a process for providing a presentation of search results for ranked resources.

FIG. 2 is a flow diagram of a process 200 for providing a presentation of search results for ranked resources. For example, the process 200 can be used by the search engine from the environment 100.

The process receives a query specifying an entity (202). For example, the query may include the name of a musical artist, a musical album, a movie, a television show, a play, a city, e.g., to which the user may travel, a restaurant, an airline, or a hotel, to name a few.

The process determines two or more resources each of which provide a transaction related to the entity (204). The resources may include web pages that provide a preview of a song or an album, a movie trailer, tickets to the play, allow a user to make travel plans to the city, or allow a user to make reservations at the restaurant, on the airline, or at the hotel.

The process determines, for each of the resources, an effectiveness measure that is a measure of the effectiveness of the resource to provide, to the user, the transaction related to the entity (206). For instance, a travel agency with which the user has an account may require less input from the user and receive a higher effectiveness measure, e.g., for the user, than another travel agency with which the user does not have an account. The effectiveness measure for a particular resource may be different for different users, types of user devices, e.g., desktop v tablet v smart phone, and/or based on particular applications or versions of applications installed on the requesting user device.

In some implementations, the search engine determines a quantity of steps required by a user of the user device to perform the transaction, or present the media content, on the user device upon accessing the respective resource when determining an effectiveness measure. For example, the search engine determines that a first quantity of steps to be performed by the user of the user device to present the media content using a first resource is greater than a second quantity of steps to be performed by the user of the user device to present the media content using a second resource and assigns the first resource with a higher effectiveness measure than the second resource In some implementations, the search engine determines an affinity measure that indicates an affinity of the user for a corresponding publisher of the respective resource when determining an effectiveness measure. The affinity measure may indicate a likelihood that the user will access content maintained by the corresponding publisher. For instance, when a first user accesses a web page maintained by the band "Example Band" more frequently than other resources for the band and a second user accesses a web page maintained by a music publisher "Music Player" for information about the band "Example Band" more frequently than other resources, the search engine would assign the web page maintained by the band a higher affinity measure than the other resources for the first user, and, for the second user, would assign the web page maintained by the music publisher a higher affinity measure than the other resources, e.g., including the web page maintained by the band.

The search engine may determine that the user device includes a first application for a first publisher and does not include a second application for a second publisher, and assign a first resource for the first publisher a higher affinity measure than a second resource for the second publisher. In some examples, the search engine may determine that the user device includes a first application, for a first publisher, that the user uses more frequently than a second application for a second publisher, and assign a first resource for the first publisher a higher affinity measure than a second resource for the second publisher.

The search engine may determine a first quantity of first user devices operated by the user that include a first application for a first publisher and a second quantity of second user devices operated by the user that include a second application for a second publisher, determine that the first quantity is greater than the second quantity, and assign a first resource for the first publisher a higher affinity measure than a second resource for the second publisher. The first and second publishers and the first and second applications are both different.

The search engine may determine that the user has explicitly requested search results from a first publisher and not from a second publisher, e.g., using a corresponding user profile, and assign a first resource for the first publisher a higher affinity measure than a second resource for the second publisher.

The search engine may determine that the user subscribes to content from a first publisher and not from a second publisher and rank a first resource for the first publisher a higher affinity measure than a second resource for the second publisher. The search engine may use an indication that the user has an account with the first publisher and does not have an account with the second publisher to assign the first resource a higher affinity measure than the second resource. The first and second publishers are different publishers.

The search engine may determine that the user is connected to a first publisher on a social network and is not connected to a second publisher on the social network, e.g., based on a relationship and/or conversation between the two on the social network, and assign a first resource for the first publisher a higher affinity measure than a second resource for the second publisher. The search engine may use a type of connection between the user and the publishers to determine an affinity measure for a resource with respect to a particular user. For instance, when the user communicates with the first publisher more frequently, using the social network, than the second publisher, the search engine may determine that the user has a greater affinity for the first publisher than the second publisher and assign resources maintained by the first publisher higher affinity measures than resources maintained by the second publisher. In some examples, when a social network includes different types of connections or relationships, the search engine may use the connection or relationship type when determining an affinity for the user with the publishers and corresponding affinity measures for respective resources maintained by the publishers.

The search engine may determine that the user has accessed first web pages, or resources, published by a first publisher more than second web pages, or resources, published by a second publisher, and assign a first resource for the first publisher a higher affinity measure than a second resource for the second publisher. The search engine may determine that other users performed the transaction with a first publisher, or accessed the media content related to the entity from the first publisher, more frequently than from a second publisher, and assign a first resource for the first publisher a higher affinity measure than a second resource for the second publisher.

The transaction or the media content may be the same, or of the same type, for the other users as the user. For instance, the search engine may determine that the other users entered the same query and performed a particular transaction or viewed particular media content and that the user has a high likelihood of performing the same action or viewing the same media content after receipt of the same query from the user. The search engine may determine that a group of users that performed a particular action or viewed particular content after sending the same query to the search engine indicates an overall user preference, e.g., affinity, for the group of users, toward performing a particular transaction or type of transaction or accessing a particular artist's content using a particular resource or publisher.

The search engine may assign the resources respective affinity measures using a frequency with which respective media content provided by each of the respective resources is accessed. The frequency may be a frequency with which a resource is accessed, the transaction is performed, e.g., completed, using the respective resource, or media content is accessed using the respective resource.

The process ranks the resources using, at least in part, the respective effectiveness measures (208). For instance, the search engine assigns resources with higher effectiveness measures higher rankings.

The process provides a presentation of search results for the ranked resources (210). The presentation displays the search results for the higher ranked, e.g., higher effectiveness measure, resources more prominently. For instance, search results for higher ranked resources are included above search results for lower ranked resources in the presentation.

The user device may receive the presentation of the search results and display the presentation to the user. The user device may receive selection of one of the search results and request a respective resource from the search engine or another server, e.g., using a link included in the respective search result.

The user device may present the requested resource to the user to enable the user to view media content or perform an action associated with the query and the entity. The user device may automatically perform an action, such as playing the media content, depending on the resource selected by the user. For instance, a resource with a respective search result that has a higher effectiveness measure than another search result may be assigned the higher effectiveness measure because the resource is more likely to automatically play media content than the respective other resource for the other search result. In some examples, the resource may require less information from the user to perform a particular action or transaction, such as purchasing movie tickets or concert tickets, e.g., for a particular musical artist or orchestra.

The order of steps in the process 200 described above is illustrative only, and providing the presentation of search results for the ranked resources can be performed in different orders. For example, a search engine may determine two or more resources each of which provide the transaction related to the entity, e.g., step 204, prior to receiving the query specifying the entity, e.g., step 202.

In some implementations, the process 300 can include additional steps, fewer steps, or some of the steps can be divided into multiple steps. For example, the process 300 may include additional ranking algorithms, such as an algorithm that generally ranks search results or resources, e.g., without consideration of an effectiveness measure, and merges the general ranking with the ranking performed in step 208 or performs both rankings concurrently, e.g., as a single ranking. In some implementations, the process 300 determines the search results for the resources, without ranking the resources, and ranks the search results. In some examples, the process may determine the quantity of steps required by the user of the user device to present the media content or perform the transaction for the entity, may determine the affinity measure, or both while determining the effectiveness measure.

In some examples, the process 300 receives input indicating a selection of one of the search results and provides a respective resource to the user device. The process 300 may automatically stream media content to the user device with the respective resource and/or identify user profile data, e.g., that may be used to complete a transaction, and provide the identified user profile data to the user device with the respective resource.

3.0 Optional Implementation Details

In some implementations, the search engine may store an officialness signal that indicates an authority of a respective resource. For instance, a resource maintained by an artist may have a greater officialness signal, with respect to a query for the artist's name, than a resource maintained by one of the artist's fans. The search engine may store the officialness signal in a database.

An officialness signal may be determined by the search engine, or another server, algorithmically and/or through a manual verification process. For example, a server may attempt to infer an officialness signal for a particular resource, e.g., using data about the particular resource. If the server is unable to infer the officialness signal, or an accuracy signal for the officialness signal does not satisfy a threshold value, the server may prompt a user associated with the particular resource, e.g., who is identified as maintaining the resource, as part of a manual process to verify that the user is the entity, e.g., artist, described on the particular resource.

In some implementations, the search engine, or the scoring engine, may use a signal that represents whether or not users completed a transaction or accessed media content for a particular resource. Resources for which users completed a transaction or accessed media content may have a higher effectiveness measure. The signal, or another signal, may indicate an extent to which the media content was accessed. For instance, a particular web page that includes a file for a song that is always played, but rarely for more than a portion of the duration of the song, e.g., thirty seconds, may be assigned a lower effectiveness measure than another web page that is not accessed as frequently but for which the corresponding song is almost always played to completion.

In some implementations, a first application, e.g., a web browser, may provide search results to a user and a second application, e.g., developed by a content provider, may provide a presentation of a resource, which corresponds with one of the search results, to the user. For example, user selection of a link in the first application may cause a user device to launch the second application and the second application to provide a presentation of the resource that corresponds with the selected link to the user.

In some implementations, an effectiveness measure may represent a proximity of an entity, affiliated with a corresponding search result, with respect to a physical location of a user device that submitted a search request to a search engine. For instance, when a search engine receives a request for "Italian Restaurants" from a device physically located in Minneapolis, a search result for a restaurant in Minneapolis may have a higher effectiveness measure than a restaurant in Saint Paul, assuming all other signals for both of the restaurants are the same or correspond with a same effectiveness measure.

4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

Figure 3:
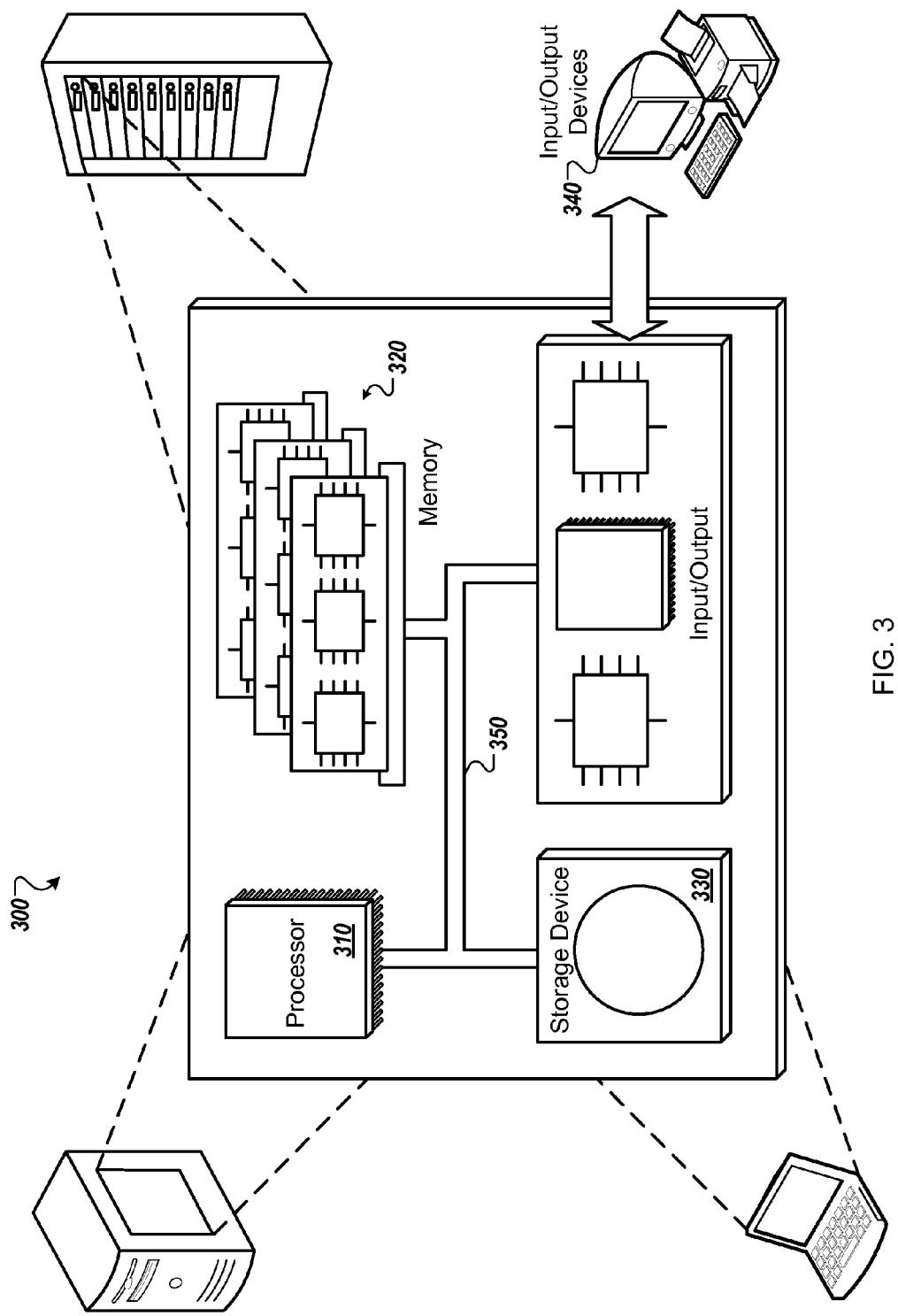
FIG. 3 is a block diagram of a computing system that can be used in connection with computer-implemented methods described in this document.

An example of one such type of computer is shown in FIG. 3, which shows a schematic diagram of a generic computer system 300. The system 300 can be used for the operations described in association with any of the computer-implement methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

receiving, from a user device, a query specifying an entity;

determining two or more resources each of which provide media content related to the entity and require receipt of user input to enable the user device to present the media content;

for each of the resources, determining an effectiveness measure that is a measure of the effectiveness of the resource to present, to a user of the user device, the media content related to the entity by determining, for each of the two or more resources, a quantity of steps that a user of the user device is required to perform to cause the respective resource to present the media content for the respective resource on the user device, the quantity of steps being required in response to accessing the respective resource after receipt of a selection of a corresponding search result for the respective resource, wherein at least one of the search results does not provide a direct link to the respective media content and has a quantity of steps that is greater than one;

ranking each of the resources using, at least in part, the respective effectiveness measure including the respective quantity of steps that a user of the user device is required to perform to cause the respective resource to present the media content for the respective resource on the user device, the quantity of steps being required in response to accessing the respective resource after the receipt of the selection of a corresponding search result for the respective resource; and providing, to the user device, a presentation of search results for the ranked resources.

2. The method of claim 1 wherein the entity comprises a musical artist or a music album.

3. The method of claim 1 wherein:
determining the quantity of steps that a user of the user device is required to perform to cause the respective resource to present the media content for the respective resource on the user device, the quantity of steps being required in response to accessing the respective resource comprises:
   determining that a first quantity of steps that a user of the user device is required to perform to cause a first resource to present the media content for the first resource on the user device is greater than a second quantity of steps that a user of the user device is required to perform to cause a second resource to present the media content for the second resource on the user device; and
   assigning a first effectiveness measure to the first resource that is a lower effectiveness measure than a second effectiveness measure assigned to the second resource; and
ranking each of the resources using, at least in part, the respective effectiveness measure comprises assigning, using the first effectiveness measure and the second effectiveness measure, a first raking to the first resource that is a lower ranking than a second ranking assigned to the second resource.

4. The method of claim 1 wherein determining the effectiveness measure comprises:
determining an affinity measure that indicates an affinity of the user for a corresponding publisher of the respective resource; and
determining, for each of the resources, the effectiveness measure that is a measure of the effectiveness of the resource to present the media content related to the entity using the affinity measure for the corresponding publisher of the respective resource.

5. The method of claim 4 wherein determining the affinity measure that indicates an affinity of the user for the corresponding publisher of the respective resource comprises:
determining that the user device includes a first application for a first publisher and does not include any second applications for a second publisher;
determining a first affinity measure that indicates an affinity of the user for the first publisher using the determination that the user device includes the first application for the first publisher and does not include any second applications for the second publisher; and
assigning a first resource for the first publisher a higher affinity measure than a second resource for the second publisher using first affinity measure that indicates an affinity of the user for the first publisher.

6. The method of claim 4 wherein determining the affinity measure that indicates an affinity of the user for the corresponding publisher of the respective resource comprises:
determining that the user device includes a first application for a first publisher that the user uses more frequently than a second application for a second publisher;
determining a first affinity measure that indicates an affinity of the user for the first publisher using the determination that the user device includes the first application for the first publisher that the user uses more frequently than the second application for the second publisher; and assigning a first resource for the first publisher that is different from the first application with a higher affinity measure than a second resource for the second publisher that is different from the second application using first affinity measure that indicates an affinity of the user for the first publisher.

7. The method of claim 4 wherein determining the affinity measure that indicates an affinity of the user for the corresponding publisher of the respective resource comprises:
determining a first quantity of first user devices operated by the user that include a first application for a first publisher and a second quantity of second user devices operated by the user that include a second application for a second publisher;
determining that the first quantity is greater than the second quantity;
determining a first affinity measure that indicates an affinity of the user for the first publisher and a second affinity measure that indicates an affinity of the user for the second publisher using the determination that the first quantity is greater than the second quantity, wherein the first affinity measure is greater than the second affinity measure; and
assigning a first resource for the first publisher a higher affinity measure than a second resource for the second publisher using first affinity measure that indicates an affinity of the user for the first publisher and the second affinity measure that indicates an affinity of the user for the second publisher.

8. The method of claim 4 wherein determining the affinity measure that indicates an affinity of the user for the corresponding publisher of the respective resource comprises:
determining that the user has explicitly requested search results from a first publisher and not from a second publisher;
determining a first affinity measure that indicates an affinity of the user for the first publisher using the determination that the user has explicitly requested search results from the first publisher and not from the second publisher; and
assigning a first resource for the first publisher a higher affinity measure than a second resource for the second publisher using first affinity measure that indicates an affinity of the user for the first publisher.

9. The method of claim 4 wherein determining the affinity measure that indicates an affinity of the user for the corresponding publisher of the respective resource comprises:
determining that the user subscribes to media content from a first publisher and not from a second publisher;
determining a first affinity measure that indicates an affinity of the user for the first publisher using the determination that the user subscribes to media content from the first publisher and not from the second publisher; and
assigning a first resource for the first publisher a higher affinity measure than a second resource for the second publisher using first affinity measure that indicates an affinity of the user for the first publisher.

10. The method of claim 4 wherein determining the affinity measure that indicates an affinity of the user for the corresponding publisher of the respective resource comprises:
determining that the user is connected to a first publisher on a social network and is not connected to a second publisher on the social network;
determining a first affinity measure that indicates an affinity of the user for the first publisher using the determination that the user is connected to the first publisher on the social network and is not connected to the second publisher on the social network; and assigning a first resource for the first publisher a higher affinity measure than a second resource for the second publisher using first affinity measure that indicates an affinity of the user for the first publisher.

11. The method of claim 4 wherein determining the affinity measure that indicates an affinity of the user for the corresponding publisher of the respective resource comprises:

determining that the user has accessed two or more first web pages published by a first publisher more than the user has accessed two or more second web pages published by a second publisher;

determining a first affinity measure that indicates an affinity of the user for the first publisher using the determination that the user has accessed the two or more first web pages published by the first publisher more than the user has accessed the two or more second web pages published by the second publisher; and assigning a first resource for the first publisher a higher affinity measure than a second resource for the second publisher using first affinity measure that indicates an affinity of the user for the first publisher.

12. The method of claim 4 wherein determining the affinity measure that indicates an affinity of the user for the corresponding publisher of the respective resource comprises:

determining that other users accessed the media content related to the entity from a first publisher more frequently than from a second publisher;

determining a first affinity measure that indicates an affinity of the user for the first publisher using the determination that other users accessed the media content related to the entity from the first publisher more frequently than from the second publisher; and assigning a first resource for the first publisher a higher affinity measure than a second resource for the second publisher using first affinity measure that indicates an affinity of the user for the first publisher.

13. The method of claim 1 wherein determining, for each of the resources, the effectiveness measure that is a measure of the effectiveness of the resource to present the media content related to the entity comprises:

assigning each of the resources a respective affinity measure using a frequency with which respective media content provided by each of the respective resources is accessed.

14. The method of claim 4 wherein determining the affinity measure that indicates an affinity of the user for the corresponding publisher of the respective resource comprises:

determining that the user has a user account with a first publisher and does not have a user account with a second publisher;

determining a first affinity measure that indicates an affinity of the user for the first publisher using the determination that the user has a user account with the first publisher and does not have a user account with the second publisher; and assigning a first resource for the first publisher a higher affinity measure than a second resource for the second publisher using first affinity measure that indicates an affinity of the user for the first publisher.

15. The method of claim 1, wherein determining two or more resources each of which provide media content related to the entity and require receipt of user input to enable the user device to present the media content comprises determining two or more resources each of which provide access to an audio file or a video file related to the entity and require receipt of user input to enable the user device to present the audio file or the video file.

16. A system, comprising:
a data processing apparatus; and
a non-transitory computer readable storage medium in data communication with the data processing apparatus and storing instructions executable by the data processing apparatus and upon such execution cause the data processing apparatus to perform operations comprising:

receiving, from a user device, a query specifying an entity;

determining two or more resources each of which provide a transaction related to the entity and require receipt of user input to enable the user device to perform the transaction;

for each of the resources, determining an effectiveness measure that is a measure of the effectiveness of the resource to provide, to a user of the user device, the transaction related to the entity by determining, for each of the two or more resources, a quantity of steps that a user of the user device is required to perform to cause the respective resource to perform the transaction related to the entity using the user device, the quantity of steps being required in response to accessing the respective resource after receipt of a selection of a corresponding search result for the respective resource, wherein at least one of the search results does not provide a direct link to a resource initiates the transaction and has a quantity of steps that is greater than one;

ranking each of the resources using, at least in part, the respective effectiveness measure including the respective quantity of steps that a user of the user device is required to perform to cause the respective resource to perform the transaction related to the entity using the user device, the quantity of steps being required in response to accessing the respective resource after the receipt of the selection of a corresponding search result for the respective resource; and providing, to the user device, a presentation of search results for the ranked resources.

17. The system of claim 16 wherein the query comprises a request for a restaurant reservation.

18. The system of claim 16 wherein providing the presentation of the search results for the ranked resources comprises providing a presentation of a first search result with a higher effectiveness measure more prominently than a second search results with a lower effectiveness measure.

19. The system of claim 18 wherein providing the presentation of the first search result with the higher effectiveness measure more prominently than the second search results with the lower effectiveness measure comprises providing a presentation with the first search result above the second search result.

20. The system of claim 16 wherein:
determining the quantity of steps that a user of the user device is required to perform to cause the respective resource to perform the transaction related to the entity using the user device, the quantity of steps being required in response to accessing the respective resource comprises:

determining that a first quantity of steps that the user of the user device is required to perform to cause a first resource to perform the transaction related to the entity using the user device is greater than a second quantity of steps that the user of the user device is required to perform to cause a second resource to perform the transaction related to the entity using the user device; and assigning a first effectiveness measure to the first resource that is a lower effectiveness measure than a second effectiveness measure assigned to the second resource; and ranking each of the resources using, at least in part, the respective effectiveness measure comprises assigning, using the first effectiveness measure and the second effectiveness measure, a first raking to the first resource that is a lower ranking than a second ranking assigned to the second resource.

21. A non-transitory computer readable storage medium storing instructions executable by a data processing apparatus and upon such execution cause the data processing apparatus to perform operations comprising:

receiving, from a user device, a query specifying an entity;

determining two or more resources each of which provide media content related to the entity and require receipt of user input to enable the user device to present the media content;

for each of the resources, determining an effectiveness measure that is a measure of the effectiveness of the resource to present, to a user of the user device, the media content related to the entity by determining, for each of the two or more resources, a quantity of steps that a user of the user device is required to perform to cause the respective resource to present the media content for the respective resource on the user device, the quantity of steps being required in response to accessing the respective resource after receipt of a selection of a corresponding search result for the respective resource, wherein at least one of the search results does not provide a direct link to the respective media content and has a quantity of steps that is greater than one;

ranking each of the resources using, at least in part, the respective effectiveness measure including the respective quantity of steps that a user of the user device is required to perform to cause the respective resource to present the media content for the respective resource on the user device, the quantity of steps being required in response to accessing the respective resource after the receipt of the selection of a corresponding search result for the respective resource; and providing, to the user device, a presentation of search results for the ranked resources.

* * * * *